(12) United States Patent
O'Brien

(10) Patent No.: US 6,536,485 B1
(45) Date of Patent: Mar. 25, 2003

(54) ROOM TEMPERATURE HYDROGEN PACKAGING USING A SOLVENT

(76) Inventor: Robert N. O'Brien, 2614 Queenswood Dr., Victoria, B.C. (CA), V8N 1X5

( * ) Notice: Subject to any disclaimer, the term of this patent is extended or adjusted under 35 U.S.C. 154(b) by 0 days.

(21) Appl. No.: 09/943,422

(22) Filed: Aug. 31, 2001

(51) Int. Cl.$^7$ .................................................. B65B 1/04
(52) U.S. Cl. ................. 141/3; 141/9; 141/100
(58) Field of Search .................. 141/3, 9, 20, 100–104, 141/83, 94, 95, 198, 192

(56) References Cited

U.S. PATENT DOCUMENTS

| | | | |
|---|---|---|---|
| 5,427,160 A | * | 6/1995 | Carson et al. .................. 137/7 |
| 5,913,344 A | * | 6/1999 | Wronski et al. ................ 141/4 |
| 6,435,224 B2 | * | 8/2002 | Blatt et al. ...................... 141/21 |

* cited by examiner

*Primary Examiner*—Steven O. Douglas

(57) ABSTRACT

Prior research into methane storage as a solute gas dissolved in special blended hydrocarbon liquids, and recent developments in use of supercritical fluids as solvent replacements, disposed the inventor to create a novel form of hydrogen packaging by dissolution in a specially blended solvent maintained at specified temperature and pressure conditions at which intermolecular attractions and related critical region phenomena permit storing nine times as much dissolved hydrogen in a given volume than pure hydrogen at the same conditions. The solvent constituents selected are ethane and hexane respectively in a nine-to-one parts by weight ratio, and the solution is prepared and intended to be maintained in its packaged state at room temperature and from twenty to fifty atmospheres of pressure. The solution may be combusted in toto as a fuel, or, if desired, known means for separation of hydrogen may be applied so as to deliver pure hydrogen to a fuel cell.

5 Claims, 2 Drawing Sheets

ROOM TEMPERATURE HYDROGEN PACKAGING USING A SOLVENT

BACKGROUND OF THE INVENTION—TECHNICAL FIELD

My new hydrogen packaging technology classifies well with special gas packages or receptacles having abosorbents, adsorbents, or solvents. It more particularly concerns room temperature packaging of hydrogen in a receptacle containing a solvent comprising a special blend of hydrocarbons, of which at least one solvent component will be at or near its critical region state under the temperature and pressure conditions prescribed for practice of the invention.

Any method of room temperature hydrogen packaging, whether using highly compressed pure gas or my present invention, incurs less need for elaborate apparatus than does cryogenic storage. I consider a low cost container to be highly desirable in connection with providing a hydrogen source for electric vehicle fuel cells, or internal or external combustion engines, er for any hydrogen-consuming application where production of large numbers of portable, refillable containers is contemplated. Portability is not, however, essential in all possible application areas; for example, in certain load-levelling schemes for large-scale electrical power systems, storing hydrogen produced by electrolysis of water during periods of off-peak consumption would employ a large stationary container, operated on the same principles of smaller packaging systems embodying my invention.

BACKGROUND OF THE INVENTION—RELATED ART

Recent developments in supercritical fluids used as solvents seem to point somewhat generally in the direction of the invention. 'SFE', or ie., supercritical fluid extraction, is known to include mixing hydrogen and supercritical carbon dioxide for a variety of processes, such as hydrogenating oils, isomerization, polymerization, and conducting certain chemical syntheses. The enhancement of solvation accounting for increasing utilization of supercritical fluids in a solvent role has not been directed to enhanced dissolution of low molecular weight, highly volatile gases like hydrogen, however, but has mainly been directed to dissolving high molecular weight, low volatility solids and liquids like fats and oils. My packaging of hydrogen in solution with below-specified hydrocarbons is thought to exploit critical region phenomena in a manner unanticipated by any known proposal to admix a supercritical fluid and hydrogen.

On a terminological issue, attention is drawn to use by D. Dixon and K. Johnston in their reference entry for "SUPERCRITICAL FLUIDS", KIRK-OTHMER *Encyclopedia of Chemical Technology,* of the term 'compressed fluid' to cover a co-extensive meaning I encompass hereinafter using 'dense-phase fluid' as a more recently fashionable term of jargon. The term 'compressed fluid' was used by Dixon and Johnston to encompass "either a supercritical fluid, a near-critical fluid, an expanded liquid, or a highly compressed gas, depending on temperature, pressure, and composition." In disclosing my present invention, I employ 'dense-phase fluid' synonymously, as covering the same four forms of 'compressed fluid' mentioned by Dixon and Johnston. These forms of fluid do not correspond to sharply distinct states of matter, which are not found in the thermodynamic vicinity where critical region phenomena occur, causing many substances to manifest appreciable departures from classical expected behaviour of ideal liquids, ideal gases, ideal solutions or ideal mixtures. For example, where ordinary engineering practice commonly regards liquids as so negligibly compressible as to be practically incompressible, this is not the case for expanded liquids, which manifest both gas-like compressibility and diffusivity even though at liquid-like densities. In or near critical regions, fluid viscosities often are intermediate between what is usual for gases on the one hand and liquids on the other. It is thought that such concurrence in dense-phase fluids of both gas-like and liquid-like properties underlies their recognized utility for replacement of many traditional organic liquid solvents.

Rather than concern with use of solvents for extractive processes, for cleaning in general, or for thinning of viscous resins, glues, or paints to promote handling ease, the present invention concerns solvation as a technique for storing a solute gas, viz., dissolved hydrogen, the gas being thereby packaged for subsequent use in fuel cells or combustion apparatus, eg., engines, torches, and the like. There are at least two old familar examples of storing combustible gases as solutes in liquids: acetone has long been known to store dissolved acetylene; and propane condensed under pressure to the liquid state is known capable of storing dissolved methanee.

Early in 1990, in SAE Technical Paper 900586 entitled "Methane Solubility and Methane Storage in Suitable Liquid Hydrocarbon Mixtures", I and B. D. Turnham reported our investigation into possible advantages of fueling combustion engines powering road vehicles with methane stored by dissolution in propane or other hydrocarbons, experimentally blending some mixtures intended to make improved methane packaging solvents. We reported that about 70% more methane could be packaged in a given tank filled with an appropriate mixture of liquid hydrocarbons than by storing the methane alone in the same tank at the same temperature and pressure. In some compositions we made and tested, reduced solvent mixture densities obtained by selective blending of different hydrocarbons produced effective methane-packaging solvents which made for lighter weight packaging than pure propane. Ethane containing blends in particular seemed to hold promise and in the SAE paper we stated: "In fact ethane itself with a critical temperature of 305 K was tested as a possible solvent but good data could not be obtained."

Retrospectively, I consider that our data collection difficulties pertaining to some aspects of the methane storage research are attributable at least in part to critical region phenomena, eg., critical opalescence. The methane storage research in a sense predisposed me when subsequently turning to hydrogen storage to revisit ethane and other light hydrocarbons as possible storage media, ie., for making hydrogen packaging solvents.

In the vast accumulation of background data accessible to workers in the field are calculations of the mole fraction of dissolved hydrogen when in solution with condensed ethane at very high pressures and temperatures far below ethane's critical region, which R. J. Sadus has supplied in a Table in *High Pressure Phase Behaviour of Multicomponent Fluid Mixtures,* Elsevier Science Publishers, 1992. For example, the mole fraction of hydrogen of 0.728, equivalent to approximately 10% by weight, is listed for a binary ethane and hydrogen mixture at 175.2° K (ie., −97.8° C.) and a pressure of 233 MPa (ie., approximately 2,299 international standard atmospheres). Although 10% by weight of hydrogen in solution is better than the amount achieved by a number of known hydrogen storage methods utilizing packaging media, it is my opinion that the magnitudes of refrigeration and high pressure involved make the Sadus thermodynamic data merely citable as pertinent and of interest, rather than as disclosing a practical new method of hydrogen storage. Such extreme thermodynamic conditions require costly and elaborate apparatus and receptacles both to produce and to maintain.

BRIEF SUMMARY OF THE INVENTION

Important objects of the present hydrogen packaging method include: 1. a less energy-consuming manner of forcing a given amount of hydrogen at room temperature into the volume of a given receptacle than by forcing hydrogen alone into an empty receptacle; 2. a less energy consuming manner of packaging hydrogen than by its cryogenic liquifaction or other process requiring a great magnitude of refrigeration; 3. reduced packaging system weight by comparison to metal hydride type systems; 4. cheaper receptacle filling material to act as a hydrogen storing medium at less expense than costly to manufacture nanoscale particulate absorbents based on carbon allotrophs; and, 5. reduced need for exceptionally strongly built pressure vessels rated considerably above fifty atmospheres to store hydrogen non-cryogenically.

I have discovered how to utilize, as effective hydrogen packaging media, relatively inexpensive and readily obtained alkanes or paraffins, also called saturated aliphatic hydrocarbons, processable using simple apparatus to procure a solvent with capacity to store hydrogen as a solute at room temperature and at from at least about twenty atmospheres up to fifty atmospheres of pressure, wherein, when a solvent component is in or near its critical region and forms a dense-phase fluid, a much greater amount of molecular hydrogen per litre of containerized solution is dissolved than would otherwise be storable by itself in the same size container at the same conditions, as merely a compressed gas. The essential concept involves that the volume of a suitable container at those conditions should be shared by the hydrogen with a dense-phase fluid solvent component of the solvent comprising blended aliphatic hydrocarbons with which the hydrogen is in solution, forming a single phase that fills the container. Preferred as the hydrogen-packaging solvent in carrying out the invention is a mixture of nine parts by weight ethane and one part by weight hexane, but I expect that minor proportioning adjustments and substitutions are within the skill of those in the art, who if desiring to do so could readily substitute one specific aliphatic hydrocarbon component in place of another without truly departing from the principles and spirit of the invention. For example, if butane with its lower carbon number were to be substituted in place of hexane as the minor component, more would be used, whereas if octane with its higher carbon number were the substitute, then less would be used.

According to projections, when one litre of preferably constituted solution weighs about 150 grams, from about 10% and up of that will be the dissolved hydrogen. That is, I suggest storing at least about 15 grams of hydrogen per litre by its dissolution in the solvent. If hydrogen were stored by itself at room temperature and twenty atmospheres, merely as a compressed gas, the weight of hydrogen per litre would not be above about 1.65 grams. Thus it is apparent that a single container filled with a solution applying my invention can package as much hydrogen as can be stored unmixed in nine identical containers at the same conditions.

In certain circumstances as discussed below, for some but not all application end-uses, there will be a need to separate the hydrogen for use. That need can be met by resort to one or another of at least two well known types of separation process, the best known two being separation by selective diffusion using a palladium membrane or the like, and by so changing thermodynamic conditions as to reduce solubility for the solute of the solvent portion of the solution and incur a phase separation liberating an excess of hydrogen from that previously dissolved. I consider the state of the art respecting such separations and related separation technologies to be within the skill of those skilled in the art, without undue experimentation, who will doubtlessly work out many details of separating schemes which are properly regarded as outside the scope of the present invention.

Without wishing to be bound by any theory, I assume that in some way generally resembling solubility enhancement phenomena encountered in the near-critical conditions for ethane in my previous research, ie., with dissolved methane, there here likely occurs a conferral of short-range order that spaces hydrogen molecules closer together for the given pressure than in typical unreactive gaseous mixtures wherein the usual assumption is that co-presence of non-reacting components is without their having significant effect on one another. Not to my knowledge mentioned anywhere in the field as applying to resolution of room temperature hydrogen packaging problems without need for high pressures above fifty atmospheres is myessentially simple to carry out suggestion to employ as a storage medium, co-occupying a receptacle with hydrogen, a substantially binary fluid solvent comprising suitably blended aliphatic hydrocarbons, at least one of which, the major component, should be a dense-phase fluid at or near critical region conditions when packaging the solute (hydrogen), for example: ethane. I prefer a blend of ethane and hexane respectively in a nine-to-one parts by weight ratio to form the solvent. Using "substantially" to qualify "binary fluid solvent" is appropriate here because if ordinary technical grade hexane is employed—which it can be—there will generally be contained therewith, without detrimental effect, minor amounts of other n-alkanes besides ethane, meaning in that case, if very strictly speaking, that the solvent body is actually a multi-component type at least ternary or higher rather than perfectly binary, although being substantially binary insofar as having one significant major component together with a significant minor one, as the two important members of a substantially binary solvent system.

Although the invention per se relates to subject matter which might well be conveyable without a drawing, as it has been above, its manner of being put to use in technical applications contexts will be more readily understood by having reference below to schematic figures of drawing which illustrate prophetic examples of filling and using receptacles and adjunct apparatus in practice of the new hydrogen packaging method of my invention.

DETAILED DESCRIPTION OF THE INVENTION

Figure 1:
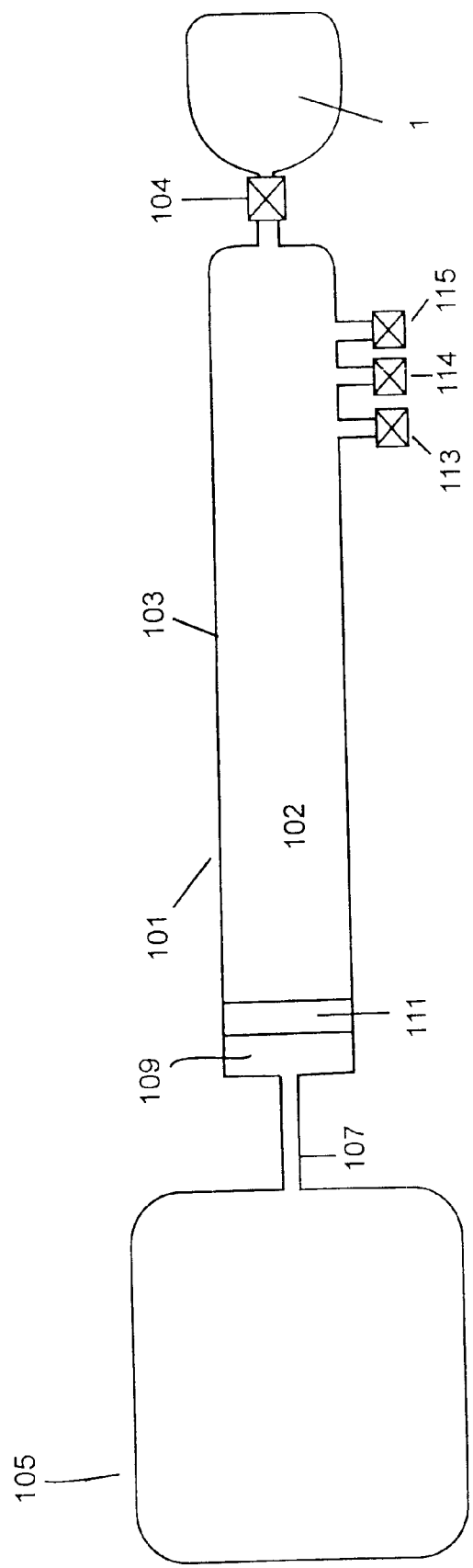
FIG. 1 schematically illustrates equipment for filling a container with the composition of the invention.

Routineers of the art of packaging fluid solutions under pressure in suitable containers will appreciate from the three basically schematic figures of the drawing that neither extensive experimentation or undue delay for development or procurement of special apparatus is likely to impede putting the above disclosed essentially simple invention into practice. The exact mechanical structures and object shapes rudimentarily shown do not need to be closely followed, inasmuch as various obvious equivalents to the suggested apparatus components are easily found.

With reference to FIG. 1, a variable-volume pressurization chamber generally designated 101 employs a movable piston 111 which by means of a hydraulic system comprising a hydraulic liquid 109, conduit 107, and means for liquid pressure genIeration 105, affords a typical convenient way to apply a calculated magnitude of pressure to ethane, hexane, and hydrogen introduced to working volume 102 from supply sources (not shown) connected to metered valve inlets 113, 114, and 115. Except for absence of a window in chamber wall 103, chamber 101 works like and resembles a variable-volume view cell used for supercritical fluids research studying phase behavior and related phenomena for sample fluids brought by control of temperature and pressure into thermodynamic vicinities of their critical region states. Chamber 101 is here used, with assumption of a room temperature condition, as a production apparatus for filling a succession of reservoirs 1 with the specified solution-packaged hydrogen using as the solvent a blend of ethane and hexane proportioned by weight respectively in a nine parts to one ratio. A predetermined quantity of solution is forced through valve 104 into a detachable reservoir 1 by suitable movement of piston 111 to the right in the figure. Expected within the routineers' skill is capability to regulate use of chamber 101 and adjunct apparatus components in a manner such that the filled pressure in reservoir 1 will be caused to be from at least about twenty atmospheres up to about fifty atmospheres as prescribed in the above SUMMARY, which has also prescribed room temperature, ie., 22° C.

Room temperature notably is somewhat lower than a 32.2° C. critical-temperature for the ethane if it were considered by itself, while at the higher end of the permissible pressure range fifty atmospheres is somewhat higher that ethane's critical pressure of 48.2 atmospheres. Nevertheless, in the instant case of its blend with hexane and hydrogen, all implications of single-substance critical state data are not expected to obtain. For the greatest portion of the range of conditions, the ethane should be considered a dense-phase fluid, in particular an expanded liquid or near-critical fluid rather than a gas condensed to a normally liquified state as would obtain for it if alone and subjected simultaneously to a cooler temperature than 32.2° C. and higher pressure than 48.2 atmospheres.

Inside a filled reservoir 1, construction of which must withstand fifty atmospheres internal pressure plus a safety margin, what is packaged is a single phase of composite chemical makeup having no normal liquid present at the prescribed pressure and composition at room temperature. This composite phase contains no normal liquid or normal gas state in the classical senses. Within the range of pressure from at least about twenty atmospheres up to about fifty atmospheres, my expanded liquid containing formulation is capable of undergoing de-compression within that range without phase separation condensing out either the major (eg., ethane) or minor (eg., hexane) components of the substantially binary solvent.

Figure 2:
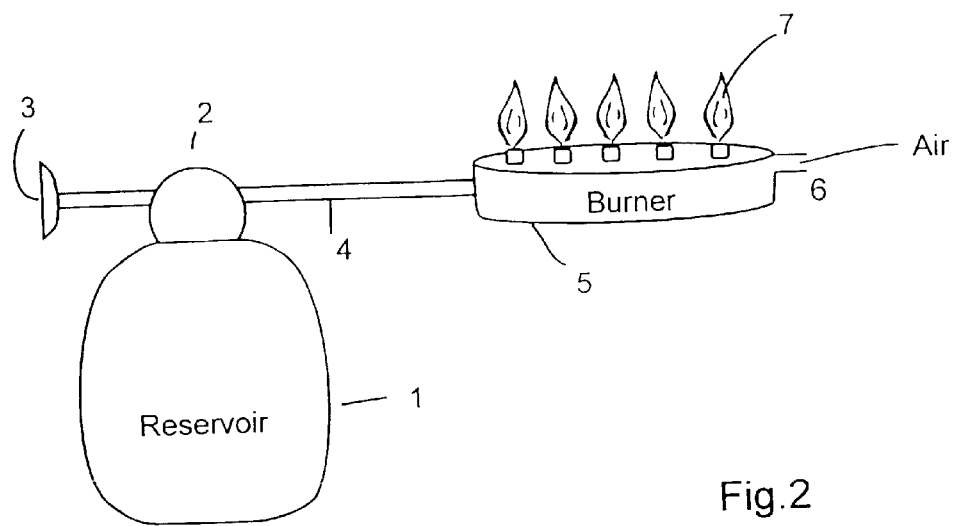
FIG. 2 illustrates a container filled with the composition of the invention, supplying a burner with fuel for combustion.
Figure 3:
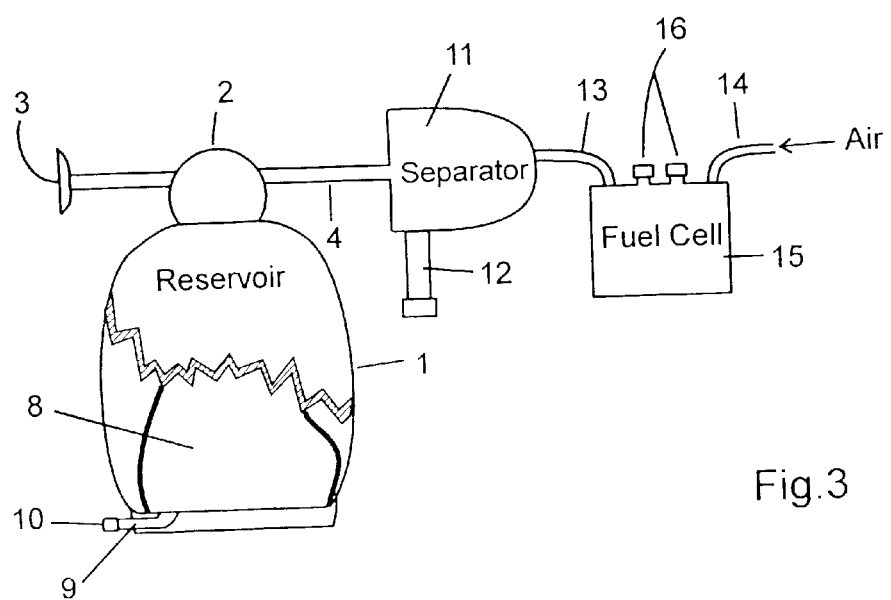
FIG. 3 illustrates the composition-filled container in train with a hydrogen separator unit from which a fuel cell receives hydrogen.

With reference to FIGS. 2 and 3 regarding what they are mainly intended to illustrate, my intention is to suggest utility of my prescribed composition whether the end-use involves separating the hydrogen or not. As a fuel for combustion purposes in engines and torches, as indicated by way of example in FIG. 2, ethane-hexane-hydrogen can be fed to and burned in any suitable burning means also fed with air. In both FIGS. 2 and 3, the figure element 2 represents a delivery valve housing containing a suitable valve, not shown, figure element 3 represents valve control means, and figure element 4 represents a delivery outlet conduit. Flames 7 are shown rising from burner 5, fed by air at inlet 6 in FIG. 2.

I grant that future production costs of the fuel components—ethane, hexane, and hydrogen—are too uncertain to confidently predict advantages arising from a fuel costs standpoint alone; however, I believe there are bound to occur special technological circumstances where compactness of a fuel packaging system is of overriding importance, and here significance of the invention resides in the already mentioned point that nine times more hydrogen is storable in a given volume under the conditions prescribed for the blend of my invention, than when unblended hydrogen is similarly stored alone, according to my calculations. The opportunity to advantageously pipeline fuel composed in accordance with the invention is also evident by considering that although delivery conduit 4 in FIG. 2, and also in FIG. 3, is apparently short and could sustain flow therethrough based on simple pressure drop considerations depending on operation of end-use apparatus, there are no great impediments to lengthening the conduit indefinitely and to supplying typical adjunct pumping means for comparatively long-distance transmission of fuel.

With reference next to FIG. 3, application of the invention to supplying hydrogen to a fuel cell is depicted with contemplation of need to insert a hydrogen separator unit 11 between delivery conduit 4 and a hydrogen inlet 13 to fuel cell 15 to which air enters at 14, the fuel cell function being to produce electrical current in any circuit, not shown, connected to terminals 16. Although it is conceivable that some future fuel cell may be devised which can accept the dense-phase fluid blend of the invention as its fuel without hydrogen separation, I have neither devised such a cell nor know of any that is presently available. Therefore, until such indefinite time when separation becomes unnecessary due to technical advances outside the scope of the present invention, there will need to be appropriate use of any known manner of hydrogen separation, when a fuel cell requiring input of pure hydrogen is the end-use apparatus. I expect that, between a fuel cell 15 and reservoir 1 containing hydrogen-enriched fluid according to the blend using the ethane and hexane alkanes as I propose. either one of the following two general classes of hydrogen separation means would usefully be interposed in the manner suggested by FIG. 3: (1) the palladium membrane class of separator; and (2) the phase change, or rectifying, class of sepparator that would condense solvent constituents, viz., the ethane and hexane, to normal liquid states, which substantially would free the solute gas, hydrogen, because of lower solubility for the hydrogen respecting the alkanes when not in the region of critical phenomena. Details of hydrogen separation units of either of these two specific classes, or of any other known type, are outside the scope of my invention but well within the knowledge and skill of routineers in relevant divisions, of the chemical processing arts to arrange appropriately. In FIG. 3, figure element 12 is included to show that irrespective of type of separator 11 employed, it is desirable to recover, for process recycling or possible use independently as a fuel, the solvent system components, withdrawing the same from any separator 11 through an element 12 therewith associated. It is readily envisioned that a recovered ethane-butane solvent, for example, can be burned in a combustion engine at the same time a fuel cell consuming the separated hydrogen operates, making such a packaging method as mine well suited for incorporation into hybrid vehicles having onboard both heat engine type and electric motor type prime movers.

Remaining figure elements not already mentioned are 8, 9, and 10 in FIG. 3. Here my intention by showing them is to suggest that for some applications of the invention it will be desired to provide suitable means for maintaining a relatively constant pressure within a reservoir 1, synchronously as its fluid content is ejected. An internal inflatable bladder 8, a bladder gas inlet 9, and appropriately regulatable gas metering valving means 10 are intended as merely representative of known and/or readily arranged means for occupying volume inside reservoir 1 to make up for the quantity of product ejected therefrom.

Limitation to apparatus of comparatively small, hence portable, size is not to be inferred from what is illustrated in the drawing. Large installations wherein large quantities of the blended dense-phase fluid of the invention per se can be held are contemplated as likely to be particularly useful in schemes for load levelling carried out at facilities for large-scale electrical power generation for supply to consumers. The idea of electrolyzing water during off-peak consumption hours is well known, and the present invention, in relation to that idea, merely provides a useful alternative manner of storing the hydrogen so produced, subsequently to be separated and fed to fuel cells operated during peak consumption hours.

That the invention meets the needs set forth in particular terms above in the introductory paragraph of the SUMMARY is considered apparent in view of all the foregoing descriptive matter and inferences readily drawn therefrom. Putting a given quantity of hydrogen into solution with the specified solvent costs less in pumping energy than required to compress the hydrogen unmixed. Cryogenic hydrogen storage, which is also costly in energy, is avoided and yet at least about 15 grams per liter of hydrogzen is stored by its dissolution. The high weight of metal hydride type storing systems is also avoided. Instead of costly to manufacture nanoscale particulate carbon allotrophs to absorb hydrogen for storage, readily available petroleum fractions supply packaging media components. Pressure vessels used need not be rated to withstand internal pressures much above fifty atmospheres, allowing for a reasonable safety margin. All these advantages meeting the abovestated objects of the invention are, I readily grant, only won at the unavoided design trade-off entailment of requiring existing or readily adapted hydrogen separators if and when the end use for the packaged hydrogen requires its delivery in a pure form.

Satisfactory theoretical explanation of success of the invention promises to be a time-consuming venture in its own right, concerning which future publications would appropriately deal in not so limited a technological applicability directed manner as present disclosure of the invention concerns. Owing to conveyance of the invention in a concise and simple manner intended to enable its practice without undue delay or difficulty, though without a comprehensive theory of the invention, there appears a high likelihood that others in the art, if not myself at a later date, will have much future opportunity to introduce refinements of the disclosed approach to packaging hydrogen by resort to intermolecular interactions of expanded liquid solvent bodies blending aliphatic hydrocarbons to serve as a packaging medium for and hydrogen gas dissolved thereinto. Exclusionary rights sought for the invention are with due regard for the doctrine of equivalents to be limited in breadth to what is defined by reasonably interpreted meanings of the following claims.

I claim:

1. A method of packaging hydrogen comprising the steps of:

forming a hydrogen-containing solution at a packaging temperature of about room temperature and from about twenty to fifty atmospheres of pressure in a packaging container, wherein said hydrogen is dissolved as a solute into a substantially binary solvent comprising a blend of aliphatic hydrocarbons, wherein the critical temperature for at least one of said hydrocarbons is within about 10° C. of room temperature; and maintaining said packaging temperature and pressure in said packaging container, wherein said container includes means for introduction and for removal of said solution and is so constructed as to withstand internal pressure of fifty atmospheres plus a safety margin.

2. The method of packaging hydrogen as in claim 1, wherein said binary blend of aliphatic hydrocarbons constituting said solvent consists of nine parts by weight of ethane to one part by weight of hexane.

3. The method of packaging hydrogen as in claim 1, wherein said solution is prepared in a variable-volume chamber from which predetermined amounts of solution are transferred successively into replicated numbers of said container.

4. The method of packaging hydrogen as in claim 1, wherein said container has a solution delivery conduit adapted to supply said solution to a device that combusts the solution without separation of said hydrogen from said hydrocarbons.

5. The method of packaging hydrogen as in claim 1, wherein said container has a solution delivery conduit adapted to supply said solution to a hydrogen separator unit interposed between said container of packaged hydrogen and a fuel cell.

* * * * *